United States Patent [19]

Sandberg

[11] 3,715,137
[45] Feb. 6, 1973

[54] ENERGY ABSORBING STRUCTURES
[75] Inventor: Gary K. Sandberg, Aloha, Oreg.
[73] Assignee: Omark Industries, Inc., Portland, Oreg.
[22] Filed: Sept. 18, 1970
[21] Appl. No.: 73,403

[52] U.S. Cl. .....................................293/1, 188/1 C
[51] Int. Cl. ........................B60r 19/04, F16d 63/00
[58] Field of Search...188/1 C; 213/1 A; 293/DIG. 3, 293/1, 70, 89; 297/216

[56] References Cited

UNITED STATES PATENTS

| | | | |
|---|---|---|---|
| 1,699,473 | 1/1929 | Maier | 293/73 |
| 2,615,373 | 10/1952 | Pegard | 90/58 |
| 2,682,931 | 7/1954 | Young | 188/1 |
| 3,482,653 | 12/1969 | Shinmaki et al. | 188/1 |

Primary Examiner—Gerald M. Forlenza
Assistant Examiner—Robert Saifer
Attorney—Buckhorn, Blore, Klarquist and Sparkman

[57] ABSTRACT

A fastener unit has a drawable rod and a retainer at one end of the shank and a die at the other end of the shank. The retainer in one embodiment is a riveted head on the shank. In another embodiment the retainer is a threaded head on the shank. In another embodiment the retainer includes a threaded plug on the shank. A further embodiment includes a vehicle bumper having a bracket bolted to a frame bracket by an energy absorbing fastener.

16 Claims, 18 Drawing Figures

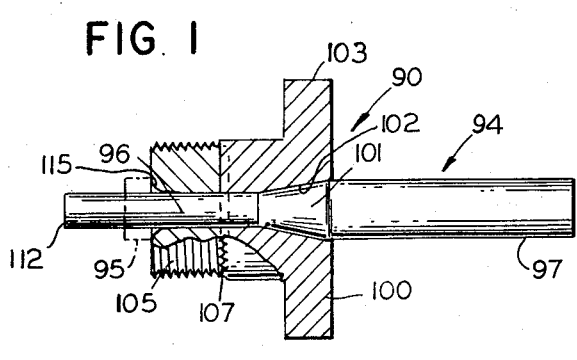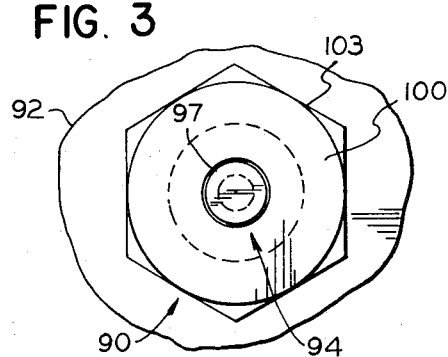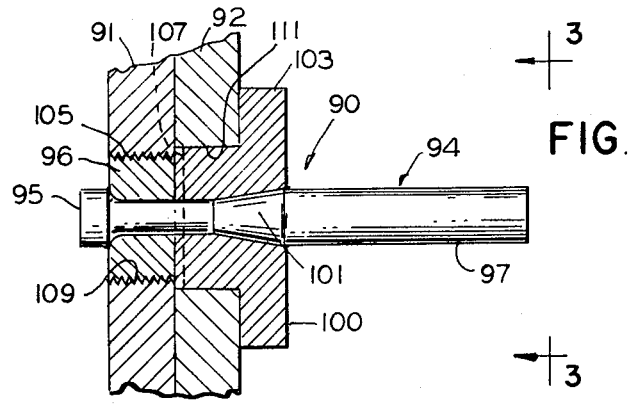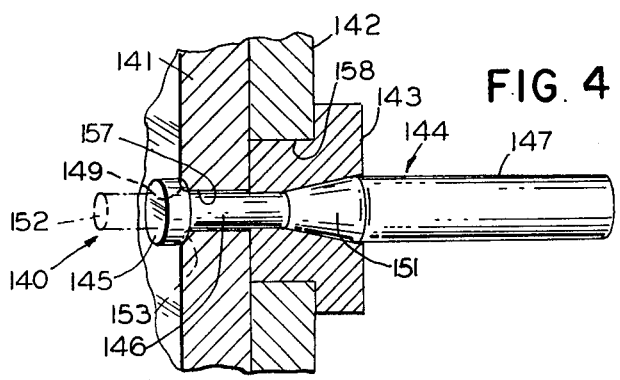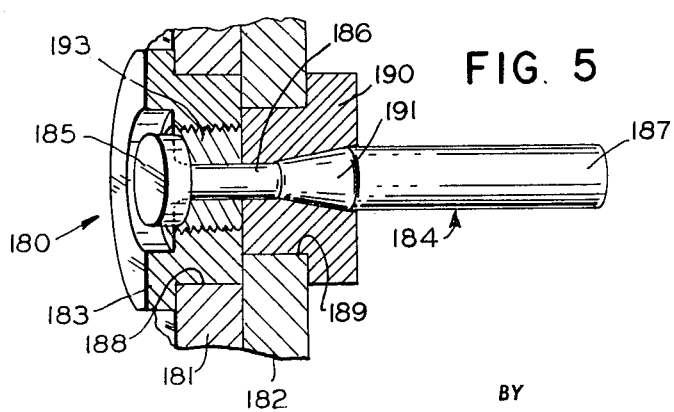

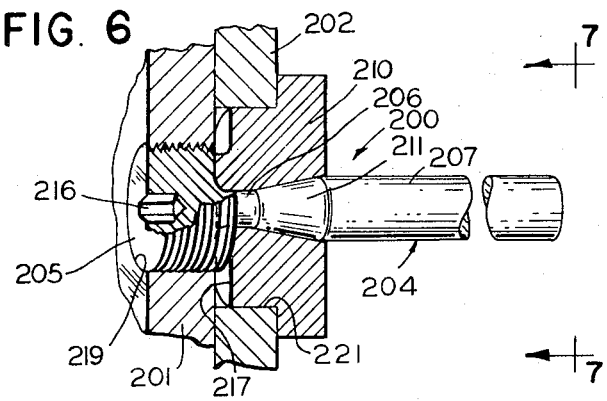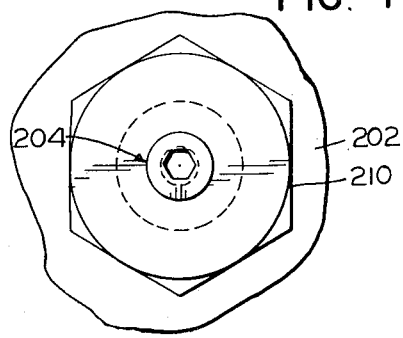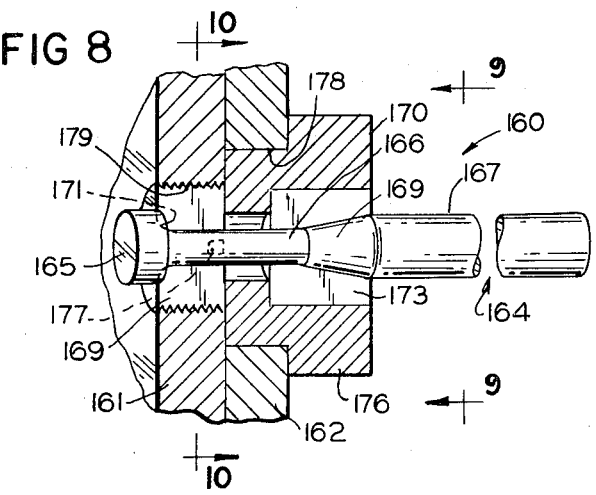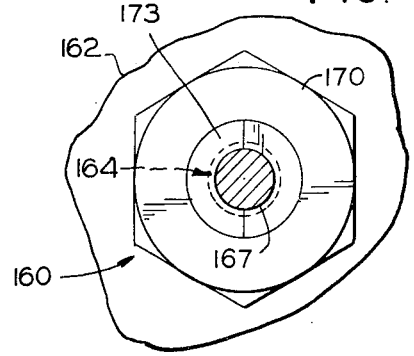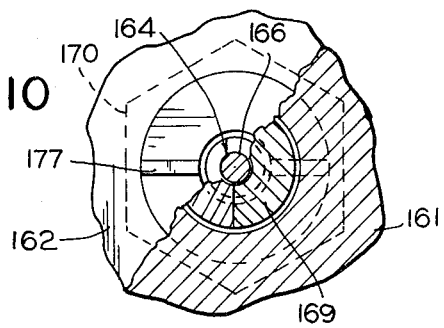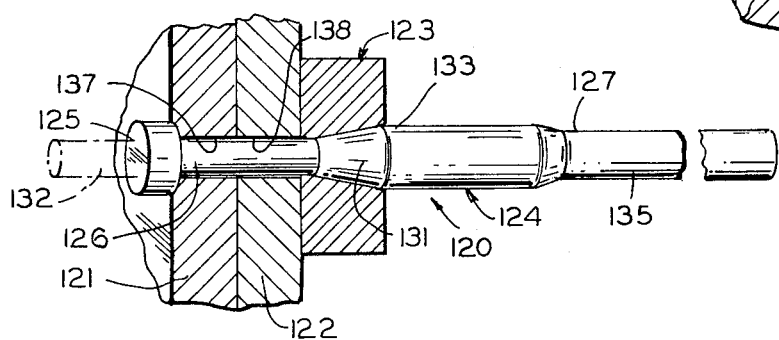

PATENTED FEB 6 1973

GARY K. SANDBERG
INVENTOR

BY
BUCKHORN, BLORE, KLARQUIST & SPARKMAN
ATTORNEYS 3,715,137

ENERGY ABSORBING STRUCTURES

DESCRIPTION

This invention relates to improved energy absorbing structures and more particularly to energy absorbing drawable fastener structures.

An object of the invention is to provide improved energy absorbing structures.

Another object of the invention is to provide energy absorbing drawable fastener structures.

A further object of the invention is to provide simple, inexpensive energy absorbing structures of low weight and high energy absorbing capacity.

Another object of the invention is to provide simple, inexpensive energy absorbing structures which can be used as bolts to fasten members together in close or abutting proximity.

Another object of the invention is to provide an easily replaced energy absorbing fastener unit.

Another object of the invention is to provide an inexpensive, simple drawable fastener rod.

In an energy absorbing fastener unit forming one embodiment of the invention a drawable rod has a head thereon retaining a drawing die and a threaded plug on a shank of the rod between the head and a drawable portion. In an energy absorbing fastener unit forming an alternate embodiment of the invention, a drawable rod has a rivet-type head holding a drawing die on a shank which fits closely into one member held against a second member. In an energy absorbing fastener unit forming another embodiment of the invention, a flanged nut is screwed onto a threaded plug held with a flanged die on the shank of a headed drawable rod. In an energy absorbing fastener unit forming another embodiment of the invention, a flanged die is mounted on a shank of a drawable rod between a threaded head on the rod and a drawable portion of the rod. In an energy absorbing fastener unit forming another embodiment of the invention, a drawable rod has a rivet-type head abutting a first member and a drawable portion abutting die means on a second member. In an energy absorbing fastener structure forming a further embodiment of the invention, a shank of a drawable rod is welded to one of two members held together by the rod. In a fastener structure forming another embodiment of the invention, a shank of a drawable rod is welded to a threaded plug. In a method forming an alternate embodiment of the invention, a rivet-like head is formed on one end of a drawable rod by pushing the rod axially into a heading mold with a die positioned on the shank.

In the drawings:

FIG. 1 is a sectional view of an energy absorbing fastener unit forming one embodiment of the invention;

FIG. 2 is a fragmentary, sectional view of the fastener unit of FIG. 1 securing two members in abutting relationship;

FIG. 3 is an elevation view taken along line 3—3 of FIG. 2;

FIG. 4 is a fragmentary, partially sectional perspective view of an energy absorbing fastener unit forming an alternate embodiment of the invention;

FIG. 5 is a fragmentary, partially sectional perspective view of an energy absorbing fastener unit forming an alternate embodiment of the invention;

FIG. 6 is a fragmentary, partially sectional perspective view of an energy absorbing fastener unit forming an alternate embodiment of the invention;

FIG. 7 is an elevation view taken along line 7—7 of FIG. 6;

FIG. 8 is a fragmentary, partially sectional perspective view of an energy absorbing fastener unit forming an alternate embodiment of the invention;

FIG. 9 is a vertical sectional view taken along line 9—9 of FIG. 8;

FIG. 10 is a vertical sectional view taken along line 10—10 of FIG. 8;

FIG. 11 is a fragmentary, partially sectional perspective view of an energy absorbing fastener unit forming an alternate embodiment of the invention;

EMBODIMENT OF FIGS. 1 TO 3

Figure 12:
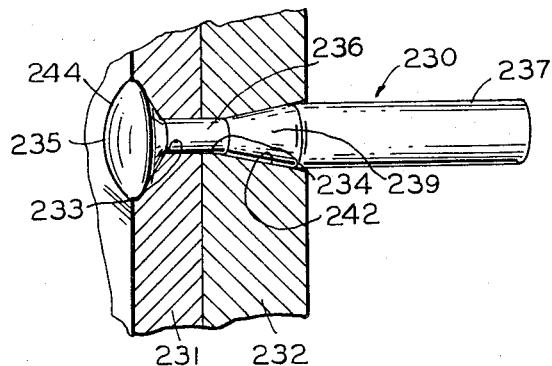
FIG. 12 is a fragmentary, partially sectional perspective view of an energy absorbing fastener unit forming an alternate embodiment of the invention.
Figure 13:
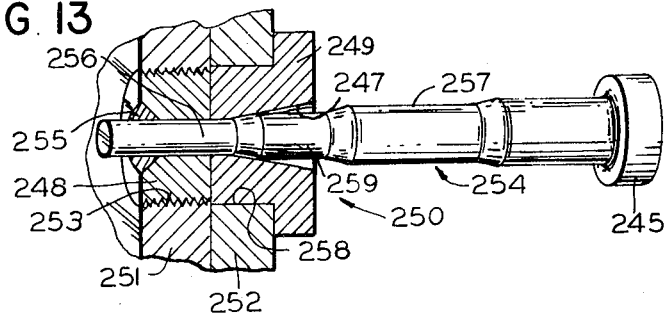
FIG. 13 is a fragmentary, partially sectional perspective view of an energy absorbing fastener unit forming an alternate embodiment of the invention.
Figure 14:
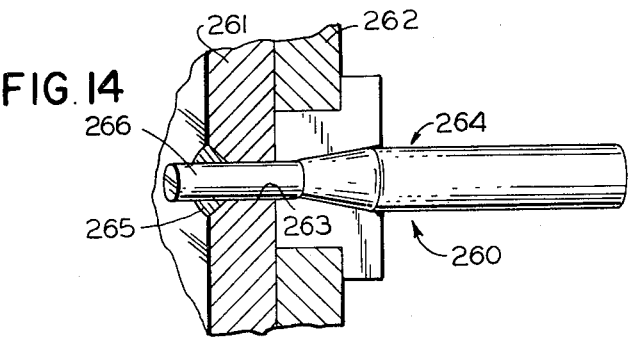
FIG. 14 is a fragmentary, partially sectional perspective view of an energy absorbing fastener unit forming an alternate embodiment of the invention.
Figure 15:
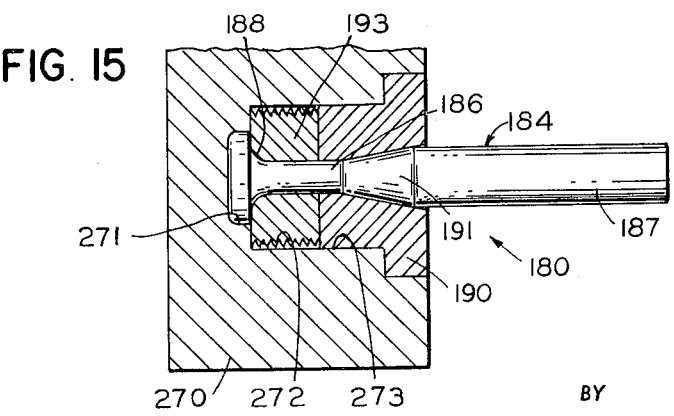
FIG. 15 is a vertical, sectional view of an energy absorbing fastener unit forming an alternate embodiment of the invention and a mold for making the unit.

Referring now in detail to the drawings, there is shown in FIGS. 1 to 3 an energy absorbing fastener unit 90 forming one specific embodiment of the invention and adapted to normally hold plate-like members 91 and 92 against separation and to absorb energy when the members are separated by a predetermined separating force, high relative to normal separating forces, the members 91 and 92 being, for example, a bumper member and a mounting bracket of an automobile. The fastener 90 includes a bolt-like, headed, drawable rod 94 having a rivet head 95, a shank 96 and an enlarged, elongated drawable portion 97. A transition portion 101 of the rod preferably is tapered, as shown in FIG. 1 but in some instances may be somewhat abruptly stepped. The transition portion 101 may be fully or partially complementary to a tapered or frustoconical drawing portion 102 of a one-piece, flanged die 100. The rod may be of a hardened steel preferably of uniform hardness throughout, the drawable portion 97 being sufficiently soft to be drawn, the hardness preferably being from about 50 to about 55 on the Rockwell C scale. The rod may be of 4140 steel or one of the commercially available steels like the 4140 but more easily machined. The rod is preferably heat treated to provide hardness of from 190,000 to 200,000 pounds per square inch, uniform throughout the rod. The rod also may be of other drawable material, such as for example, copper, aluminum or of a harder steel.

The die 100, which has a hexagonal head 103, and a one-piece, externally threaded, plug 105 are held together on the shank by the head 95 of the shank and the transition portion, FIG. 1 showing an end portion 112 of the shank before being riveted to form the head 95. The plug and the die have keying portions 107 preventing relative rotation therebetween so that the die may be driven by a wrench to screw the plug into tapped bore 109 in the member 91, the die fitting in bore 111 in the member 92. If desired, keying portions 107 may be omitted and the head be riveted sufficiently to provide sufficient keying friction for the die to drive the plug or a relatively weak bonding material may be used to secure the die and the plug together sufficiently to drive the plug.

The fastener unit 90 holds the members 91 and 92 together until a predetermined force higher than usually encountered, is exerted on the members to separate them. Then the portion 97 of the rod is drawn by the die and absorbs the force which is separating the members.

The energy absorbing capacity of the unit 90 is high relative to the weight and size thereof. This is made possible by having the strength of the head and the nut and the die each as great as the tensile strength of the shank. The ratio of the drawing stress to the yield strength of the shank is designated as the "stress ratio" of the unit, and the unit has a high stress ratio. The energy absorption is due primarily to the internal deformation of the rod as it is drawn but also includes the friction between the die and the surface of the transition portion 98 which is converted into heat. To provide a high stress ratio the difference in the diameters of the drawable portion 97 and the shank 96 is so chosen that the resistance to pulling the drawable portion through the die (the drawing and friction forces) is not substantially less than 40 percent of the tensile strength of the shank and is not substantially greater than 90 percent of that tensile strength of the shank. The head 95 has such diameter and such a length that it does not fail during the drawing of the portion 97, the strength of the head preferably being at least as great as the tensile strength of the shank. A fillet or taper 115 is provided at the juncture of the head and the shank to prevent stress concentration. The diameter and length of the plug and the size of threads of the plug and bore 109 are sufficient to provide strength at least as great as the tensile strength of the shank. The flange of the die is sufficient to provide shear strength at least as great as the tensile strength of the shank.

To minimize friction the taper of the semi-cone angle of the drawing portion 102 of the die 100 should be not substantially less than 5° and not substantially more than 15°. This somewhat lessens the total drawing force required but avoids any possibility of melting or reduced strength from excessive heat. Friction also is kept low by coating the portions 101, 107 and 102 of the rod and the die with a lubricant. The lubricant preferably forms a tough, corrosion resistant coating, and may be lead and also may be a polymer such as, for example, "Mil-Bond Draw Lubricant." The entire assembled unit 90 may be dipped in the lubricant or sprayed with the lubricant or the several parts may be coated individually. In instances where a higher initial energy absorbing force is desired, the lubricant may be omitted from the portions 101 and 102 and applied to the portion 97, this construction providing a high initial energy absorption rate followed by a lower energy absorption rate.

EMBODIMENT OF FIG. 4

A fastener unit 140 forming an alternate embodiment of the invention is identical to the unit 90 except that the unit 140 omits the plug 96. The unit 140 includes a flanged drawing die 143 fitting partly into a bore 158 in member 142, shank 146 of a drawable rod 144 extending through bore 157 in member 141. The rod has a drawable portion 147 of uniform diameter and a tapered transition portion 151. A rivet head 145 is formed by cold forming from an end portion 152 of the shank 146 when the members 141 and 142 are in place to secure the members together. The junction between the head and the shank is filleted at 153 with the bore 157 having a complementary, countersunk entrance portion 149, the fillet serving to prevent stress concentration. The head has a length and a diameter such that its strength is as great as the tensile strength of the shank 146. The stress ratio of the unit is from about 40 percent to about 90 percent. While the die 143 is shown as integral, it may be split into two halves, in which case, the bore 158 should be close fitting.

EMBODIMENT OF FIG. 5

An energy absorbing fastener unit 180 forming an alternate embodiment of the invention is identical to the unit 90 except that the unit 180 includes a flanged nut 183 fitting partly into a bore 188 in member 181 and screwed onto a plug 193 on shank 186 of a drawable rod 184 extending through the bore 188 and a bore 189 in member 182. A rivet head 185 formed on an end portion of the shank 186 of the rod 188 secures the members 181 and 182 together. The rod has a tapered transition portion 191 and a drawable portion 187. A flanged die 190 extends partly into the bore 189. The flange of the die 190 has driving flats, and the flange of the nut 183 has driving flats. The rivet head 185 forces the plug 193 and the die 190 tightly together to provide sufficient torque to screw the plug tightly into the nut 183, or the plug and the die may be keyed together or bonded together with a force substantially less than the drawing force required to draw the portion 187 through the die. The die 190 may, if desired, be a split die instead of the one-piece die shown, and if so, the split die must fit closely in the bore 189.

EMBODIMENT OF FIGS. 6 AND 7

An energy absorbing fastener unit 200 forming an alternate embodiment of the invention is identical to the unit 90 (FIG. 1) except that the unit 200 has an externally threaded head 205 of rod 204 and omits the plug 105. The unit 200 secures members 201 and 202 together, and the head 205 is screwed into tapped bore 219 in the member 201 to hold a flanged die 210 against member 202 in a position extending into bore 221. The rod has shank 206, a drawable portion 207 and a tapered transition portion 211. The head 205 has a driving wrench socket 216, and the head is riveted tightly against the die which has driving flats. The head is formed by heading the shank and then forming the thread on the head. The die has an annular relieved portion 217 to facilitate forming the thread on the head. If desired, the die may be split rather than integral; and, if it is split, the hole 221 should be close fitting on the die.

EMBODIMENT OF FIGS. 8 TO 10

An energy absorbing fastener unit 160 forming an alternate embodiment of the invention is identical to the unit 90 (FIG. 1) except for a split die 173, a die holder 170 and a split plug 169. The die holder 170 is flanged and is adapted to be passed over either a head 165 or a drawable portion 167 of a drawable rod 164, the head and the drawable portion being of the same diameter. The die holder has a counterbore adapted to receive and hold a split die 173, after which the split plug may be placed on the shank. The die holder and the halves of the split plug have complementary radial keys 177 and keyways transverse to the plane of splitting of the plug. This permits the plug to be driven by the die holder, which has a hex head 176. The halves of the plug may be "talked" together with a bonding material after assembly on the rod to permit handling as a unit.

EMBODIMENT OF FIG. 11

An energy absorbing fastener unit 120 forming an alternate embodiment of the invention has a drawable rod 124 like the drawable rod 94 except that the rod 124 has a stepped or staged drawable portion 127 to provide a staged energy absorption. The rod has a shank 126 extending through bores 137 and 138 in members 121 and 122 held together by the rod and a washer-like drawing die 123. A head 125 of the rod is formed from an end portion 132 of a shank 126 of the rod, there being a fillet at the juncture of the head and the shank which fits in a countersunk portion of the member 121.

The rod 124 has a tapered transition portion 131, and the drawable portion 127 has a first portion 133 of a large diameter and a second portion 127 of a smaller diameter than the portion 133. This staging gives, when the separating force on the rod becomes sufficiently higher than normal, an initial maximum energy absorption of short duration followed by a longer energy absorption at a lower rate and is useful for many applications. If desired, the staging may be reversed and the relative lengths of the portions 133 and 135 may be varied to provide any desired energy absorption pattern. Also, if desired, several stages may be provided. The drawing force of the portion 133 is, of course, less than the lesser of the tensile strength of the shank and the strength of the head 125.

EMBODIMENT OF FIG. 12

An energy absorbing unit 230 forming an alternate embodiment of the invention consists of a drawable rod like the rod 94 except for a head 235 which may be cold formed or riveted from an end portion of a shank 236 or may be welded to a member 231 in a countersunk portion 244 of a hole 233 in the member 231. A member 232 secured to the member 231 for normal forces has a bore 234 and a tapered die portion 242 receiving tapered transition portion 239 of the rod, the portion 239 joining the shank to cylindrical drawable portion 237. Both the strength of the head 235 or weld thereof and that of the shank should be higher than the drawing force of the drawable portion 237.

EMBODIMENT OF FIG. 13

An energy absorbing unit 250 forming an alternate embodiment of the invention is like the unit 90 except that a shank 256 of a drawable rod 254 is secured to a plug 248 by a weld or a bonding material 255 and the plug and a flanged die 249 are tacked together with sufficient strength to provide the desired torque but not as great as the tensile strength of the shank. The plug is screwed into tapped bore 253 in member 251 and the die fits in bore 258 in member 252. The rod has a transition portion 259 and a drawable portion 257. Instead of driving the plug 248 by the die 249, the plug may have spanner wrench sockets or the rod may have a driving socket in either end. Instead of the weld 255, or in addition thereto, the shank 256 may be shrunk fit by a sweating operation into the bore in the plug to provide a strong interference fit. The drawable portion 257 is stepped to provide progressively increasing energy absorption as the portion 257 is drawn. Also, an enlarged, stop head 247 is provided at the very end of the drawable portion 257 to prevent further drawing. The strength of the head is equal to or somewhat high as the tensile strength of the shank so that a 100 percent stress ratio is provided if there is excessive separating force when the stop head reaches and abuts the die 249. If desired, the diameter of the shank 256 and the portion 257 may be increased to provide a much higher absolute energy absorbing force but a much lower stress ratio and also provide a much higher final failure force of either the shank or the stop head.

EMBODIMENT OF FIG. 14

An energy absorbing fastener unit 260 forming an alternate embodiment of the invention is like the unit 230 (FIG. 12) except that a separate die 269 is provided, and a weld 265 made between a shank 266 of drawable rod 264 and a member 261, which is fastened to member 262. The shank fits in bore 263 in the member 261. Instead of the weld, the shank may be shrunk fit by sweating into the bore 263 to secure the rod to the member 261.

EMBODIMENT OF FIG. 15

In a method forming an alternate embodiment of the invention, the fastener unit 180 is assembled by inserting the plug 193 and the die 190 into portions 272 and 273 of die cavity in a mold or die 270. Then shank 186 of the rod 184 is inserted through the die and the plug against the bottom of head forming cavity 271, and the rod is pressed axially until the head 185 is formed. If desired, the shank 186 may be initially long enough to form the head, or alternately, the drawable portion may be extruded through the die to fill the cavity 271 if greater lateral support is desired.

EMBODIMENT OF FIGS. 16 TO 18

A bumper construction forming an alternate embodiment of the invention includes a pair of high stress ratio energy absorbing fastener units 280, only one of which is shown and which are identical and which normally clamp bracket members 281 and 282 tightly together.

Figure 16:
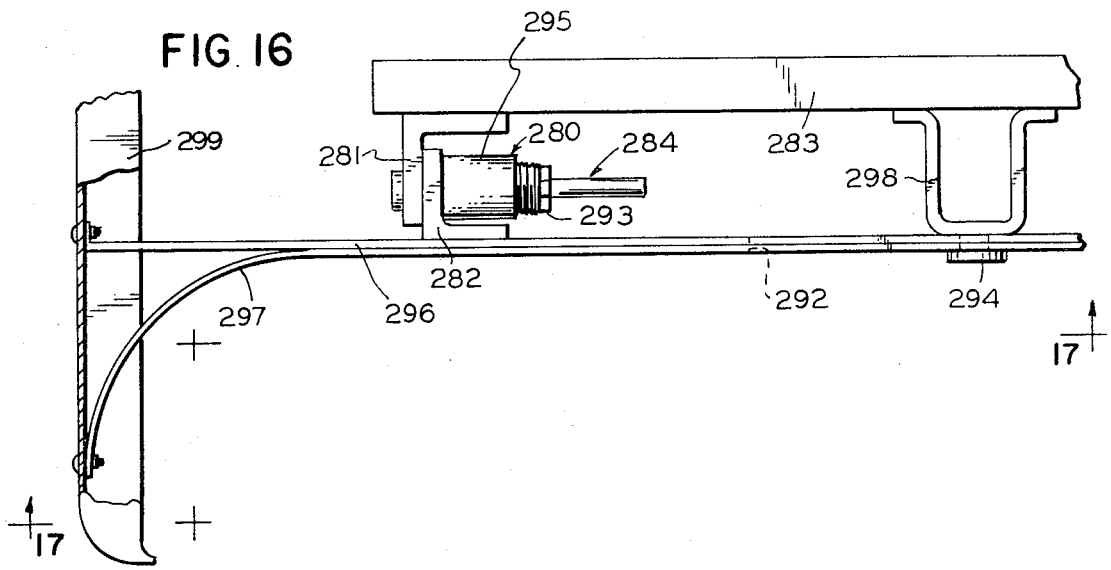
FIG. 16 is a fragmentary, partially sectional, top plan view of an automobile bumper, frame and fastener structure forming an alternate embodiment of the invention.
Figure 17:
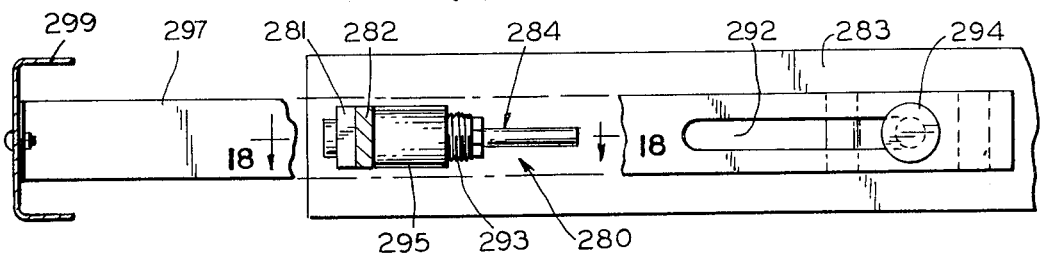
FIG. 17 is a vertical, sectional view taken along line 17—17 of FIG. 16.
Figure 18:
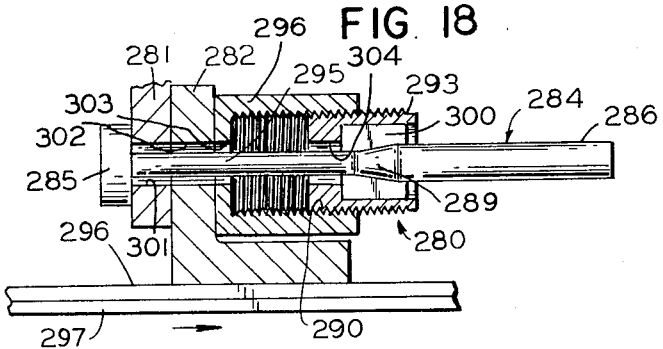
FIG. 18 is an enlarged vertical, sectional view taken along line 18—18 of FIG. 17.

The member 281 is fixed rigidly to an automobile chassis or frame 283 and the member 282 is fixed rigidly to pairs of bar-like bumper mounting members 296 and 297, which mount a bumper 299. The members 296 and 297 extend longitudinally of the automobile and have slots 292 through which extends a headed pin 294, which is fixed to a rigid U-shaped spacer 298 fixed to the chassis 283. The members 296 and 297 are welded together. The pairs of members 296 and 297 normally hold the bumper in a position spaced forwardly of the rest of the vehicle and when a collision occurs involving an excessive rearward force on the bumper (to the right as viewed in FIG. 17), drawable rods 284 are drawn by dies 290 to absorb the energy and prevent or minimize injury to occupants of the vehicle and minimize damage to the vehicle. The rods 284 may be easily replaced after such a collision. The unit 284 includes a long nut 296 and a die holder 293 and a split die 300. The rod 284 has a head 285 integral with a shank 295 of the rod 284, and also includes an elongated drawable portion 286 and a frustoconical portion fitting in the die 301. The drawable portion is adapted to pass through bores 301, 302, 303 and 304 in the members 281 and 282, the nut 296 and the die holder 293, respectively. The strength of the head 285 is substantially as high as the tensile strength of the shank 295, and the strength of the interengaging threaded portions of the nut 296 and the die holder 293 is substantially as high as the tensile strength of the shank, as is also the strength of the bottom portion of the cupped die holder. This enables the diameter of the drawable portion 286 to be sufficiently greater than the diameter of the shank to provide a high stress ratio so as to provide a large energy absorbing capacity. In a test of one constructed embodiment of the bumper construction of FIGS. 16 to 18, the stress ratio was 50%, and the car having the bumper construction mounted thereon was stopped by a rigid barrier without injury to the driver and without injury to the car at a speed of over nine miles per hour. It will be understood that, in place of the units 280, any of the units 90, 140, 180, 230, 250 and 260 may be used with slight obvious modification of the members 281 and 282 to provide high stress ratio energy absorption to the bumper construction. The units 280 are disclosed and claimed in co-pending application Ser. No. 73,499, filed Sept. 18, 1970 by Gary K. Sandberg and assigned to the same assignee as the instant application.

What is claimed is:

1. In an energy absorbing fastener unit,
a drawable rod having a shank portion of a predetermined diameter, a drawable portion of a greater diameter than than said predetermined diameter and at one end of the shank portion and a head portion of a diameter greater than said predetermined diameter and at the other end of the shank portion,
die means mounted on the shank portion,
an externally threaded plug mounted on the shank portion,
the die means and the plug being held on the shank by the drawable portion and the head portion.

2. The fastener unit of claim 1 including torque means holding the die and the plug together for turning movement and permitting relative axial movement between the die and the plug.

3. The fastener unit of claim 2 wherein the torque means comprises keying means on the die and the plug.

4. The fastener unit of claim 2 wherein the torque means comprises frictional interengagement of the die and the plug.

5. The fastener unit of claim 1 wherein the die means is one piece.

6. The fastener unit of claim 1 wherein the plug is one piece.

7. The fastener unit of claim 1 wherein the plug is split.

8. The fastener unit of claim 7 wherein the die means comprises a one-piece die holder and a split die.

9. The fastener unit of claim 1 wherein the head comprises a weld securing the shank to the plug.

10. The fastener unit of claim 1 including a nut screwed onto the plug.

11. In an energy absorbing fastener structure,
a drawable rod having a shank of a predetermined diameter,
a drawable portion at one end of the shank and larger than the shank in diameter and a head larger than said predetermined diameter at the other end of the shank,
the head being externally threaded to define a plug.

12. The energy absorbing fastener structure of claim 11 including a die mounted on the shank between the head and the drawable portion.

13. The energy absorbing fastener structure of claim 12 wherein the die is one piece.

14. The energy absorbing fastener structure of claim 13 wherein the die abuts the head and is larger in external diameter than the head, the portion of the die adjacent the head being relieved to facilitate forming the thread on the head.

15. The energy absorbing fastener structure of claim 11 wherein the head is rivet like.

16. In an energy dissipating fastener structure,
a vehicle frame having abutment members,
a bumper,
elongated bumper-supporting members on the frame for longitudinal movement relative to the frame,
and energy dissipating fastener units securing the bumper-supporting members to the abutment members to normally prevent longitudinal movement of the bumper-supporting members relative to the frame,
each fastener unit including a deformable member and a deforming means serving to dissipate energy when relative longitudinal movement occurs between the deformable member and the deforming means,
each fastener unit including means securing the deformable member to one of the abutment members and the bumper-supporting member and means securing the deforming means to the other of the abutment members and the bumper-supporting member,
the deformable member being a rod having a shank portion and an enlarged, elongated, drawable portion,
the deforming means including a drawing die,
the deforming means including a cupped die holder holding the die,
the shank portion of the rod having a fastening portion, and a nut member screwed onto the fastening portion of the shank portion,
a bracket abutting the abutment member,
the shank portion extending through the bracket and the abutment member.

* * * * *